(12) United States Patent
Zhang et al.

(10) Patent No.: US 7,647,421 B2
(45) Date of Patent: Jan. 12, 2010

(54) EXTENSION HEADER COMPRESSION

(75) Inventors: Yanji Zhang, Beijing (CN); Keijo Harju, Tampere (FI)

(73) Assignee: Nokia Corporation, Espoo (FI)

( * ) Notice: Subject to any disclaimer, the term of this patent is extended or adjusted under 35 U.S.C. 154(b) by 783 days.

(21) Appl. No.: 10/223,318

(22) Filed: Aug. 20, 2002

(65) Prior Publication Data

US 2004/0039830 A1 Feb. 26, 2004

(51) Int. Cl.
G06F 15/16 (2006.01)
(52) U.S. Cl. .................. 709/236; 709/230; 709/235; 709/246; 709/247
(58) Field of Classification Search ......... 709/230–236, 709/246, 247
See application file for complete search history.

(56) References Cited

U.S. PATENT DOCUMENTS

| | | | | |
|---|---|---|---|---|
| 6,883,035 | B2* | 4/2005 | Hannu et al. | 709/247 |
| 6,889,261 | B2* | 5/2005 | Hata et al. | 709/247 |
| 6,967,964 | B1* | 11/2005 | Svanbro et al. | 370/437 |
| 7,266,118 | B2* | 9/2007 | Ido et al. | 370/389 |
| 7,295,575 | B2* | 11/2007 | Ido et al. | 370/474 |
| 7,330,902 | B1* | 2/2008 | Bergenwall et al. | 709/232 |
| 2003/0179713 | A1* | 9/2003 | Fleming | 370/252 |
| 2004/0218601 | A1* | 11/2004 | Fleming | 370/389 |
| 2004/0264433 | A1* | 12/2004 | Melpignano | 370/349 |
| 2005/0094647 | A1* | 5/2005 | Hata et al. | 370/395.52 |
| 2005/0195750 | A1* | 9/2005 | Le et al. | 370/252 |
| 2005/0286523 | A1* | 12/2005 | Liao et al. | 370/389 |

OTHER PUBLICATIONS

C. Bormann, et al, "Request to Comments 3095, Robust Header Compression (ROHC), Framework and four Profiles: RTP, UDP, ESP and uncompressed", Network Working Group Request for Comments, XX, XX, 2001, pp. 1-168.

* cited by examiner

Primary Examiner—Nathan J Flynn
Assistant Examiner—Mohamed Wasel
(74) Attorney, Agent, or Firm—Squire, Sanders & Dempsey, LLP

(57) ABSTRACT

A method and apparatus for controlling header compression and decompression for a link of a packet data network, wherein a predetermined header extension size for the link is initially set, and wherein a packet which will not be used as reference for subsequent decompression is transmitted from the compressor to the decompressor, if an extension header list of a size larger than the predetermined header extension size has been received. At the decompressing side, the transmission of an acknowledgement is suppressed, if an extension header list of the size larger than a predetermined header extension size configured at the decompressor has been received. Thereby, inconsistency of compression context between compressor and decompressor is prevented and a higher compression efficiency is achieved since there is no need to repair the context and correctly decompressed packets can be delivered to upper network layers without discarding any packets.

17 Claims, 4 Drawing Sheets

EXTENSION HEADER COMPRESSION

BACKGROUND OF THE INVENTION

The present invention relates to a method, apparatuses and a system for controlling header compression and decompression in a packet data network, as for example an IP (Internet Protocol) based network.

In communication networks using packet data transport, individual data packets carry in a header section an information needed to transport the data packet from a source application to a destination application. The actual data to be transmitted is contained in a payload section.

The transport path of a data packet from a source application to a destination application usually involves multiple intermediate steps represented by network nodes interconnected through communication links. These network nodes, called packet switches or routers, receive the data packet and forward it to a next intermediate router until a destination network node is reached which will deliver the payload of the data packet to the destination application. Due to contributions of different protocol layers to the transport of the data packet, the length of a header section of a data packet may even exceed the length of the payload section.

Data compression of the header section may therefore be employed to obtain better utilization of the link layer for delivering the payload to a destination application. Header compression reduces the size of a header by removing header fields or by reducing the size of header fields. This is done in a way such that a decompressor can reconstruct the header if its context state is identical to the context state used when compressing the header. Header compression may be performed at network layer level (e.g. for IP headers), at transport layer level (e.g. for User Datagram Protocol (UDP) headers or Transport Control Protocol (TCP) headers), and even at application layer level (e.g. for Hyper Text Transport Protocol (http) headers).

In the IETF (Internet Engineering Task Force) specification RFC 3095, a robust header compression (ROHC) scheme is specified as a highly robust and efficient header compression scheme for RTP/UDP/IP (Real Time Transport Protocol, User Datagram Protocol, Internet Protocol), UDP/IP, and ESP/IP (Encapsulating Security Payload) headers. Existing header compression schemes do not work well when used over links with significant error rates and long round-trip times. For many bandwidth limited links where header compression is essential, such characteristics are common. During the last years, two communication technologies in particular have become commonly used by the general public: cellular telephony and the Internet. Cellular telephony has provided its users with the revolutionary possibility of always being reachable with reasonable service quality no matter where they are. The Internet, on the other hand, has from the beginning being designed for multiple services and its flexibility for all kinds of usage has been one of its strength. IP telephony is gaining momentum thanks to improved technical solutions. Cellular phones have become more general-purpose, and may have IP stacks supporting not only audio and video, but also web-browsing, e-mail, gaming, etc. Thus, two mobile terminals communicating with each other may be connected to base stations over cellular links, and the base stations may be connected to an IP-based wired network. If technically and economically feasible, a solution with pure IP all the way from terminal to terminal would have certain advantages. However, to make this a viable alternative, a number of problems have to be addressed, in particular problems regarding bandwidth efficiency.

For cellular phone systems, it is of vital importance to use the scarce radio resources in an efficient way. A sufficient number of users per cell are crucial, otherwise deployment costs will be prohibitive. The quality of the voice service should also be as good as in today's cellular systems. It is likely that even with support for new services, lower quality of the voice service is acceptable only if costs are significantly reduced.

A problem with IP over cellular links when used for interactive voice conversations is the large header overhead. Thus, the need for reducing header sizes for efficiency reasons is obvious. However, cellular links have characteristics that make header compression perform less than well. A viable header compression scheme for cellular links must be able to handle loss on the link between the compression and decompression point as well as loss before the compression point.

The context of the compressor is the state it uses to compress a header. The context of the decompressor is the state it uses to decompress a header. Either of these or the two in combination are usually referred to as "context", when it is clear which is intended. The context contains relevant information from previous headers in the packet stream, such as static fields and possible reference values for compression and decompression. Moreover, additional information describing the packet stream is also part of the context, for example information about how the IP identifier field changes and the typical inter-packet increase in sequence numbers or time stamps.

Generally, a packet corresponds to a unit of transmission and reception, e.g. a protocol data unit. The packet is compressed and then decompressed e.g. by ROHC. The packet stream corresponds to a sequence of packets where the field values and change patterns of field values are such that the headers can be compressed using the same context. When the context of the decompressor is not consistent with the context of the compressor, decompression may fail to reproduce the original header. This situation may occur when the context of the decompressor has not been initialized properly or when packets have been lost or damaged between compressor and decompressor. Context repair mechanisms are mechanisms which bring the contexts in synchronization when they were not. This is needed to avoid excessive loss due to context damage.

The main reason why header compression can be done at all is the fact that there is significant redundancy between header fields, both within the same packet header but in particular between consecutive packets belonging to same packet stream. By sending static field information only initially and utilizing dependencies and predictability for other fields, the header size can be significantly reduced for most packets. Relevant information from past packets is then maintained in the context. The context information is used to compress or decompress subsequent packets. The compressor and decompressor update their contexts upon certain events. Contexts are identified by a context identifier (CID) which is sent along with compressed headers and feedback information. The feedback information carries information from the decompressor to the compressor. An acknowledgement information (ACK) is used to acknowledge successful decompression of a packet, which means that the context is up-to-date with a high probability. Furthermore, a non-acknowledgement information (NACK) is used to indicate that the dynamic context of the decompressor is out of synchronization. This feedback information is generated when several successive packets have failed to be decompressed correctly.

The ROHC header compression scheme has three modes of operation, called unidirectional mode (U-mode), bi-directional optimistic mode (O-mode), and bi-directional reliable mode (R-mode). The optimal mode to operate in depends on the characteristics of the environment of the compression protocol, such as feedback abilities, error probabilities and distributions, effects of header size variation, etc.

When in the U-mode, packets are sent in one direction only, from the compressor to the decompressor. This mode is therefore usable over links where a return path from decompressor to compressor is unavailable or undesirable. In the U-mode, transitions between compressor states are performed only on account of periodic timeouts and irregularities in the header field change patterns in the compressed packet stream. Due to the periodic refreshes and the lack of feedback for initiation of error recovery, compression in the U-mode will be less efficient and have a slightly higher probability of loss propagation compared to any of the bi-directional modes. Compression with ROHC must start in the U-mode. Transition to any of the bi-directional modes can be performed as soon as a packet has reached the decompressor and it has replied with a feedback packet indicating that a mode transition is desired.

The O-mode is similar to the U-mode. The difference is that a feedback channel is used to send error recovery requests and optionally acknowledgements of significant context updates from decompressor to compressor. Periodic refreshes are not used in the O-mode. The O-mode aims to maximize compression efficiency and sparse usage of the feedback channel. It reduces the number of damaged headers delivered to the upper layers due to residual errors or context invalidation.

Finally, the R-mode differs in many ways from the previous two modes. The most important differences are a more intensive usage of the feedback channel and a stricter logic at both the compressor and the decompressor that prevents loss of context synchronization between compressor and decompressor except for very high residual bit error rates. Feedback is sent to acknowledge all context updates. The R-mode aims to maximize robustness against loss propagation and damage propagation, i.e. minimize the probability of context invalidation, even under header loss/error burst conditions.

ROHC is designed under the assumption that packets can be damaged between the compressor and the decompressor, and that such damaged packets can be delivered to the decompressor. ROHC detects damaged headers using cyclic redundancy check codes (CRCs) over the original headers. In the U- and O-modes, the smallest headers include a 3-bit CRC, while in the R-mode the smallest headers do not include a CRC. Thus, damage to the smallest headers is not detected in the R-mode. When working in the U-mode, all compressed headers carry a CRC which must be used to verify decompression. In the R-mode the following feedback logic is used by the decompressor. When an updating packet, i.e. a packet carrying a 7- or 8-bit CRC, is correctly decompressed, an acknowledgement (ACK(R)) with a mode parameter indicating the R-mode as the desired compression mode is sent to the compressor. On the other hand, no feedback is sent for packets not updating the context, i.e., packets that do not carry a CRC.

The decision to move from one compression mode to another is taken by the decompressor. For each context, the compressor and the decompressor maintain a variable whose value is the current compression mode and decompression mode, respectively, for that context. The value of this variable controls, for the context in question, which packet types to use, which actions to be taken, etc. At the compressor side, parameters C_MODE and C_TRANS are provided. Possible values for the C_MODE parameter are "U" for unidirectional, "O" for optimistic, and "R" for reliable. The parameter C_MODE must be initialized to "U". Furthermore, possible values for the parameter C_TRANS are "P" for pending and "D" for done. The parameter C_TRANS must be initialized to "D". When the parameter C_TRANS is set to "P", it is required that the compressor only use packet formats common to all modes, that a mode information is included in packets sent, at least periodically, and that new mode transition requests be ignored.

At the decompressor side, parameters D_MODE and D_TRANS are provided. Possible values for the parameter D_MODE are "U" for unidirectional, "O" for optimistic and "R" for reliable. The parameter D_MODE must be initialized to "U". Furthermore, possible values for the parameter D_TRANS are "I" for initiated, "P" for pending, and "D" for done. The parameter D_TRANS must be initialized to "D". A mode transition can only be initiated when the parameter D_TRANS is set to "D". While the parameter D-TRANS is set to "I", the decompressor sends a non-acknowledgement (NACK) or an acknowledgement (ACK) carrying a CRC option for each received packet.

Due to increased sizes of IP address fields, an IP header extension has been introduced to IP headers to minimize the changes necessary for supporting IP address extensions. However, when an incoming packet has a large IP extension header, the compressor and the decompressor may loose consistency between each other due to e.g. context damage, which will lead to compression and/or decompression failure. For example, context damage may result if the compressor compresses a larger IP extension header list than the decompressor is prepared to store, due to the fact that the decompressor has not allocated sufficient memory for the maximum sized IP extension header list. When the context damage happens, it may take a long time to repair the context, while during this period many packets are discarded due to incorrect decompression. An uncompressed packet type is then used to bring the context in synchronization again which causes low compression efficiency. According to another solution, sufficient memory for the maximum sized IP extension header list can be allocated to the decompressor. This will however result in huge memory uses, since the maximum size of the IP extension header list is the same as the maximum input packet size.

SUMMARY OF THE INVENTION

It is therefore an object of the present invention to provide an improved header compression scheme, by means of which context inconsistencies between the compressor and the decompressor due to large IP extension headers can be prevented.

This object is achieved by a method of controlling header compression for a link of a packet data network. The method includes the steps of setting a predetermined header extension size for said link, and transmitting a non-reference packet which will not be used as reference for subsequent decompression, if an extension header list of a size larger than said predetermined header extension size has been received.

Furthermore, the above object is achieved by a method of controlling header decompression for a link of a packet data network. The method includes the steps of setting a predetermined header extension size for said link, and suppressing transmission of an acknowledgement if an extension header list of a size larger than said predetermined header extension size has been received.

Furthermore, the above object is achieved by a compression apparatus for controlling header compression on a link of a packet data network. The apparatus includes a control unit for setting a predetermined header extension size for the link, and a header compression unit for generating a non-reference packet which will not be used as reference for subsequent decompression, if an extension header list of a size larger than said predetermined header extension size has been received.

Finally, the above object is achieved by a decompression apparatus for controlling header decompression for a link of a packet data network. The decompression apparatus includes a control unit for setting a predetermined header extension size for said link, and a header decompression unit means for suppressing transmission of an acknowledgement if an extension header list of a size larger than the predetermined header extension size has been received.

Accordingly, a header compression and decompression scheme is provided which keeps the decompressor and the compressor work in a normal manner even when a packet with large IP extension header is received. The solution is compatible with the existing ROHC standard and prevents inconsistencies of contexts between a compressor and a decompressor. Higher compression efficiency is achieved, since contexts do not have to be repaired and decompressed packets are correctly delivered to upper protocol layers without discarding any packet. Moreover, memory usage of the implementation can be reduced considerably.

The header compression may be based on an ROHC scheme. In this case, the non-reference packet transmitted from the compressor side of the link may be a packet without a generation identifier if the operation mode is U mode or O mode, wherein the generation identifier is used to indicate a same generation of header extension lists. On the other hand, the non-reference packet may be an ROHC-reliable mode packet which does not update a decompression context if the operation mode is R mode. In particular, this reliable mode packet may be an R-1 mode packet.

In case of the ROHC scheme, the header decompression may be adapted to perform a transition to a reliable mode in response to the receipt of the large extension header.

Furthermore, the suppression may be maintained until an extension header of a size less or equal to the predetermined header extension size has been received.

BRIEF DESCRIPTION OF THE DRAWINGS

In the following, the present invention will be described in greater detail based on a preferred embodiment with reference to the accompanying drawings, in which.

DETAILED DESCRIPTION OF THE INVENTION

Figure 2:
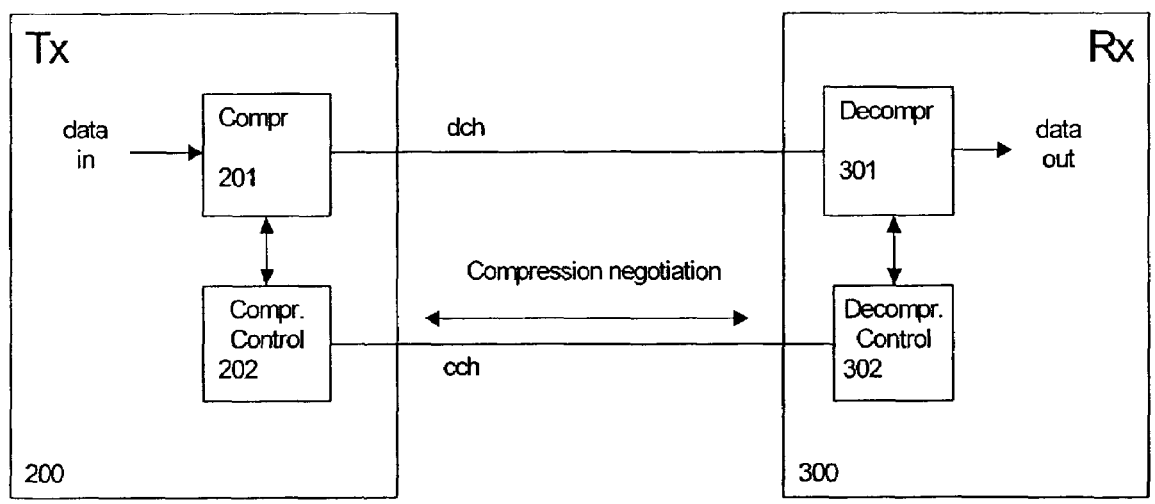
FIG. 2 shows a schematic block diagram of a transmission link comprising a compressor and a decompressor according to the preferred embodiment.

The preferred embodiment will now be described on the basis of a packet data transmission link between a transmitting entity 200 and a receiving entity 300 both using an ROHC scheme, as indicated in FIG. 2. The transmission entity 200 and the receiving entity 300 may be routers of an IP-based network, e.g. an IP-based cellular network. This method can be implemented as a computer program embodied on a computer readable medium, which includes a computer readable storage medium (e.g., a computer memory, CD-ROM, a floppy diskette, hard disk drive or any type of media suitable for storing electronic instructions) as hardware, software, or a combination of software and hardware.

The present compression and decompression scheme according to the preferred embodiment is designed to cope with large IP extension headers or header lists which may be attached to IPv4 or IPv6 headers.

Figure 1:
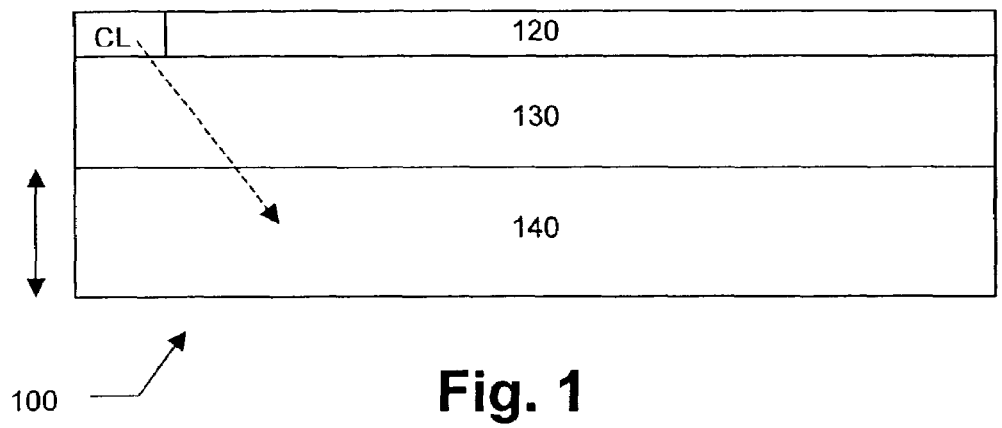
FIG. 1 shows a schematic representation of a format of an IP extension header field.

FIG. 1 shows a schematic representation of a format of an extension header field as specified in the IETF specification RFC 3095 for an ROHC compressed packet. According to FIG. 1, the extension header field comprises a flag octet 120 for indicating the presence of specific compressed sequence numbers provided in the following octets 130. The 1-bit flags are set, when the corresponding header item of the octets 120 is compressed. When a respective flag is not set, the corresponding header item is sent uncompressed or is not present. A specific first flag CL indicates the presence of a compressed header list of variable length. Thus, based on the first flag CL it can be determined whether the compressed header list 140 is attached to the extension header field 100.

Figure 3:
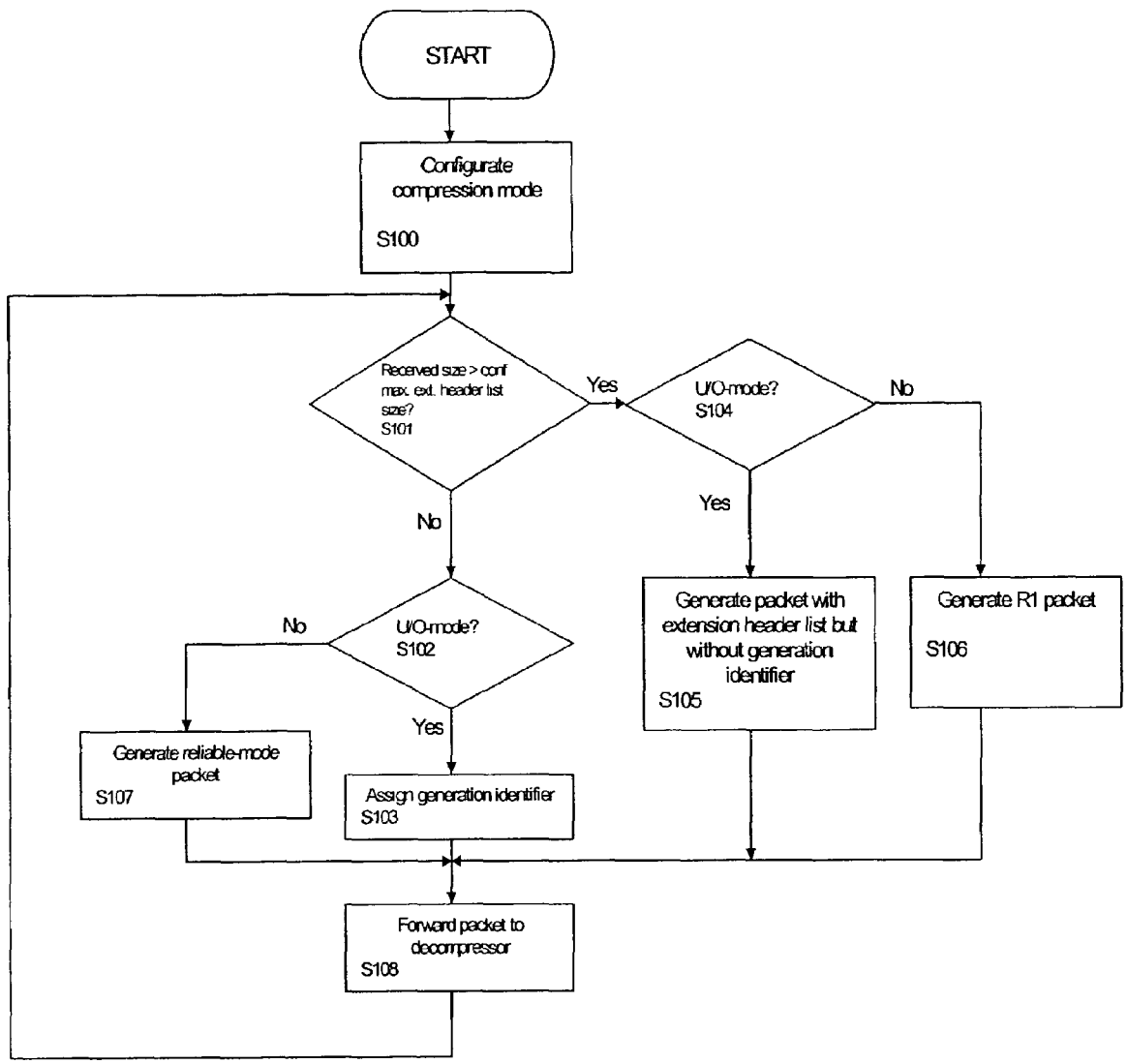
FIG. 3 shows a schematic flow diagram of a compression control procedure according to the preferred embodiment.

FIG. 3 shows a schematic flow diagram of a compression control procedure as performed in a compressing control unit 202 for controlling compression of a compressor 201 of the transmitting entity 200 shown in FIG. 2. Similarly, at the receiving unit 300 a decompressing control unit 302 is provided for controlling the decompression of a decompressor 301. The compression control unit 202 and the compressor 201 of the transmitting entity 200 may be arranged as a single unit or as software routines of a program stored at the transmitting entity 200. The same may apply to the decompressing control unit 302 and the decompressor 301 at the receiving entity 300.

It is noted that the two-line connection shown in FIG. 2 and comprising a control channel cch, which may be an out-of-band channel, and a data channel dch for connecting the compressor 201 and the decompressor 301 is to be regarded as a general or simplified representation, as the data channel dch and the control channel cch may as well relate to different signaling streams or packet units of different protocol layers. Due to e.g. individual resource limitations for ROHC, respective predetermined numbers or sizes of the IP extension header or extension header list are independently set for the concerned link, e.g. by the operator or a corresponding initialization routine at the transmitting entity and at the receiving entity. Thus, the maximum size of the extension header or extension header list is configured locally at the compressor 201 and the decompressor 301, and the one does not know which value the other is using.

According to the flow diagram shown in FIG. 3, a compression mode is initially configured in step S100. In the course of this mode configuration, a maximum allowable or supported size for the extension header list is set or configured. In step S101 of FIG. 3, a packet with an IP extension header 140 is received, which may be detected by the compressor 201, e.g., during an analysis of the incoming packet. The compressing control unit 202 checks whether the size of the received IP extension header 140 is larger than the configured maximum extension header list size set for compression at the transmitting entity 200. If not, it is checked in step S102 whether the U-mode or O-mode is set. If so, a generation identifier is assigned to the received packet in step S103.

If neither the U-mode not the O-mode is set, an R-mode packet is generated in step S107. In the present case, it is assumed that the compressor was in the U- or O-mode when the packet was received. In these modes, a sequence of identical lists are considered as belonging to the same generation and are all assigned the same generation identifier. The generation identifier is increased by "1" each time the list changes and is carried in compressed and uncompressed lists that are candidates for being used as reference lists. In reference based compression schemes, i.e. addition or deletion based schemes, compression and decompression of a list are based on the reference list which is assumed to be present in the context of both compressor 201 and decompressor 301. The compressed list is an encoding of the differences between the current list and the reference list. Upon reception of a compressed list, the decompressor 301 applies the differences to its reference list in order to obtain the original list. Normally, the generation identifier must have been repeated in at least a predetermined number of headers before the list can be used as the reference list. However, some acknowledgements may be sent in the O- or U-mode, and whenever an acknowledgement for a header is received, the list of that header is considered known and need not be repeated further. Further details regarding this reference based compression scheme can be gathered from the above IETF specification RFC 3095. In step S108, the processed packet is forwarded to the decompressor 301 and the procedure returns to step S101.

If the checking operation in step S101 of FIG. 3 leads to the result that the size of the received IP extension header list is larger than the configured maximum header extension list size, it is checked in step S104 whether the compressor 201 is in the U- or O-mode. If it is determined in step S104 that the compressor 201 is in the U- or O-mode, the compressor 201 generates a packet with extension header list 140 but without generation identifier (step S105). Such lists without generation identifier are not assigned a new generation identifier and are not used as future reference lists. Thus, they are not used to update the context at the decompressor 301.

On the other hand, if it is determined in step S104 that the compressor 201 is not in the U- or O-mode, i.e. it is in the R-mode, the compressor 201 sends a R1-* packet, which may correspond to any kind of R1 packet defined in RFC 3095 (step S106). Such packets have no CRC field and will thus also not be used as a reference for updating the context at the decompressor 301. Finally, in step S108, the generated packet is forwarded to the decompressor 301.

Figure 4:
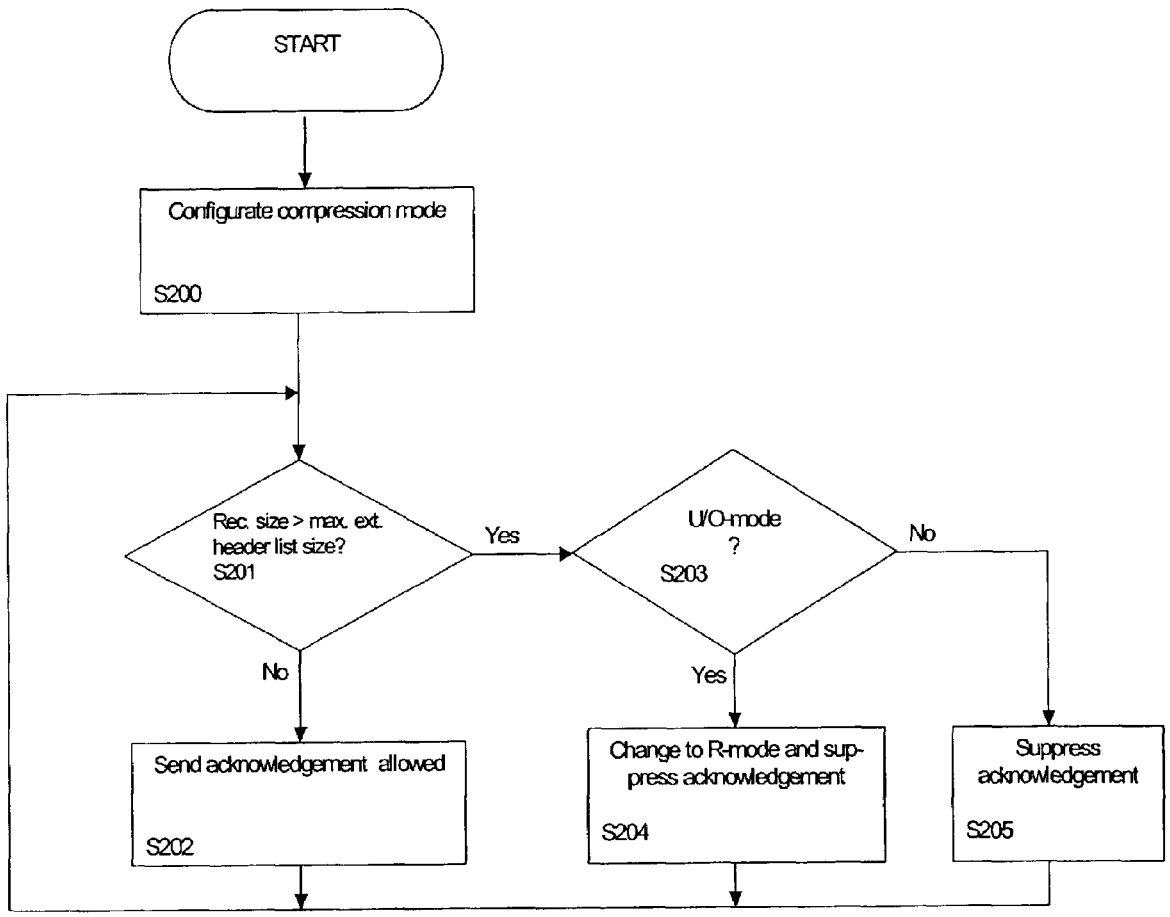
FIG. 4 shows a schematic flow diagram of a decompression control procedure according to the preferred embodiment.

FIG. 4 shows a schematic flow diagram of a decompression control procedure based on which the decompressing control unit 302 controls the decompressor 301 at the receiving entity 300. After configuration of a maximum allowable or supported extension header size for decompression in step S200, similar to step S100 in FIG. 3, it is checked in step S201 whether the size of a received IP extension header list is larger than the configured maximum size. If the received size is not larger than the configured maximum size, a normal acknowledgement is allowed to be sent to the compressor 201 in step S202. It is noted that the decompressor 301 not necessarily has to send an acknowledgement in this step, as in the U-mode or the O/R-mode not every packet is acknowledged.

On the other hand, if the received size is larger than the configured maximum size, it is checked in step S203, whether the decompressor 301 is in the U- or O-mode. If so, the decompressing control unit 302 initiates a transition to the R-mode, wherein the decompressor 301 will not send any acknowledgement after it is in the R-mode (step S204). This suppression of acknowledgements lasts until a packet with IP extension header list of a size smaller than the configured maximum size has been received. If it is determined in step S203 that the decompressor 301 is not in the U- or O-mode, i.e. it is in the R-mode, the transmission of an acknowledgement is suppressed in step S205. Finally, after steps S202, S204 and S205, respectively, the procedure returns to step S201. Thereby, no acknowledgements are sent from the decompressor 301 to the compressor 201 as long as IP extension headers with excessive size are received.

Figure 5:
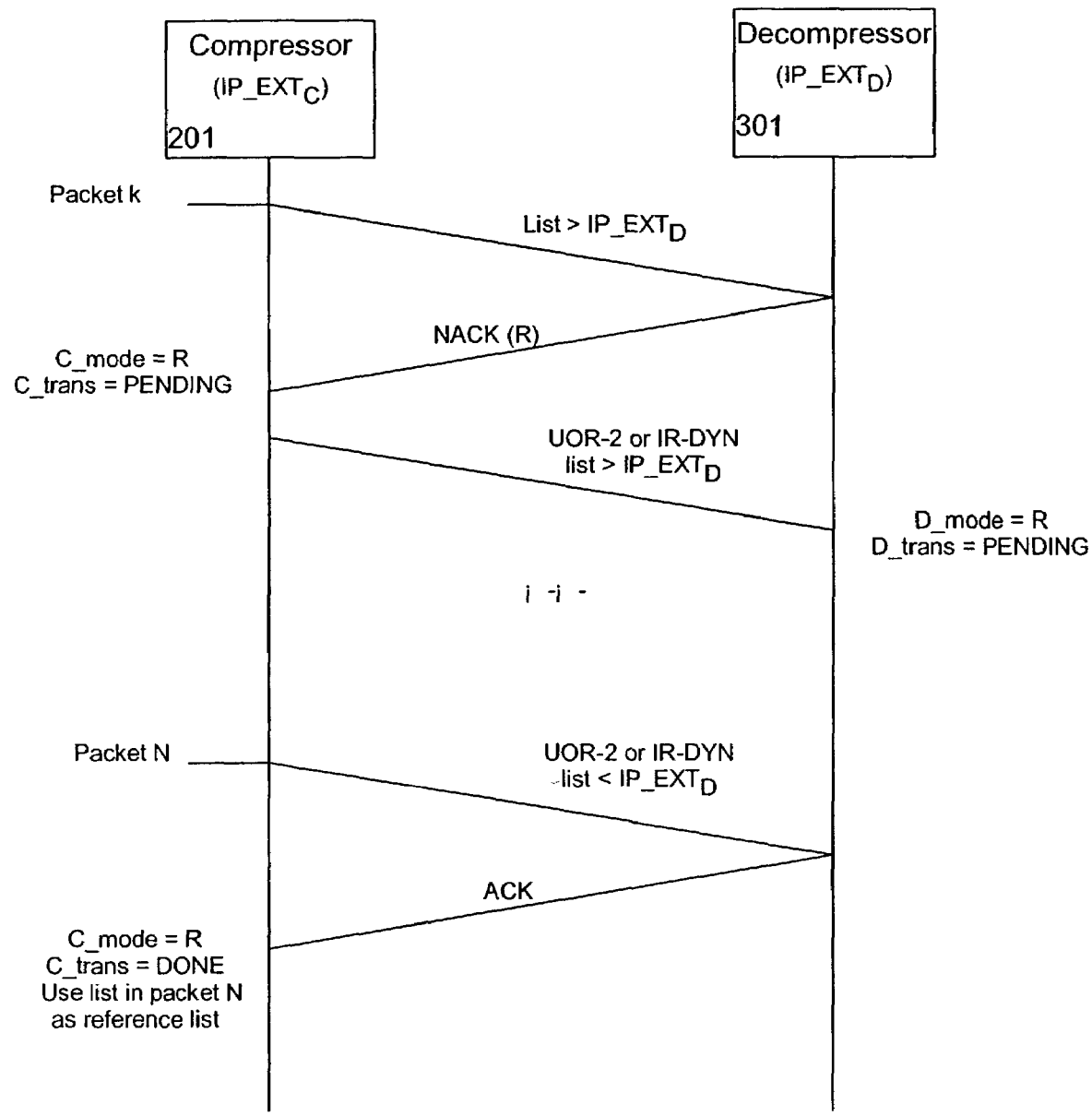
FIG. 5 shows an example of a packet flow diagram according to the preferred embodiment.

FIG. 5 shows a specific example for a packet transmission scheme between the compressor 201 with a configured maximum extension header list size IP_EXTC and the decompressor 301 with a configured maximum extension header list size IP_EXTD, when a packet k with large extension header is received.

In this example, it is assumed that the configured maximum extension header list size IP_EXTC at the compressor 201 is larger than or at least equal to the configured maximum extension header list size IP_EXTD at the decompressor 301.

The extension header list in the packet k is larger than the configured maximum extension header list size IP_EXTD at the decompressor 301 but is less than the configured maximum extension header list size IP_EXTC. As it is assumed that the compressor 210 is in the U- or O-mode, it transmits the packet with generation identifier. Furthermore, according to the procedure in FIG. 4, the decompressor 310 does not acknowledge the packet k and sends a nonacknowledgement NACK(R) with a parameter indicating a mode transition to the R-mode. Having received this NACK(R) message, the compressor 210 also performs the transition to the R-mode as indicated by the parameter C_MODE. Moreover, as no acknowledgement has been received, the parameter C_TRANS is set into state "P", since the packet k cannot be used as a reference. Then, the compressor 201 sends a packet type 2, e.g. a UOR-2, which can be used as reference for the subsequent decompression at the decompressor 301. As an alternative, the compressor 201 may send an IR-DYN packet which communicates the dynamic part of the context, i.e. parameters of non-constant functions, as defined in RFC 3095. However, the list in this packet is still larger than the configured maximum extension header list size IP_EXTD of the decompressor 301.

When the decompressor 301 which is now in the R-mode and in the D_TRANS parameter state "P" receives the UOR-2 or IR-DYN packet, it does not send any acknowledgement, as indicated in step S205 of FIG. 4. This procedure continues until a packet N with an extension header list of a size less or equal to the configured maximum extension header list size IP_EXTD has been received at the compressor 201 and forwarded to the decompressor 301. In response to the receipt of this packet with an allowable extension header list size, the decompressor 301 generates an acknowledgement ACK, and the compressor 201 sets the C_TRANS parameter to state "D" and uses the list in the packet N as a reference list for future compression.

If the decompressor 301 receives a packet with an extension header list larger than the configured maximum size IP_EXTD for decompression but without a generation identifier in the extension header list, a transition to the R-mode is not initiated. This might occur if the received list size is larger than the configured maximum size IP_EXTD at the decompressor 301 and is larger than the configured maximum size IP_EXTC, too.

When an overflow of a sliding window defined at the compressor 201 happens, it may keep all elements in the sliding window and may send an R1-* packet by using the current reference list. As an alternative, the oldest element may be removed from the sliding window and a packet with CRC can be inserted. If no feedback is received, which means that the packets in the sliding window cannot be used as reference list, the current reference list may still be used for compression.

It is noted, that the present invention is not restricted to the above preferred embodiment, but can be implemented in any acknowledged packet data transmission link, where extension headers of variable size are used. The preferred embodiment may thus vary within the scope of the attached claims.

What is claimed is:

1. A method, comprising:
controlling header compression for a link of a packet data network;
setting a predetermined header extension size for said link;
receiving a packet comprising an extension header;
comparing the size of the received extension header with said predetermined header extension size; and
transmitting a non-reference packet that will not be used as reference for subsequent decompression, when an extension header of a size larger than said predetermined header extension size has been received,
wherein the setting the predetermined header extension size and the transmitting the non-reference packet are aspects of the controlling header compression.

2. The method according to claim 1, wherein said header compression is based on a robust header compression scheme.

3. The method according to claim 2, wherein said non-reference packet is a packet without generation identifier when the operation mode is U mode or O mode, the method further comprising:
using said generation identifier to indicate a same generation of header extension lists.

4. The method according to claim 2, wherein said non-reference packet is a robust header compression reliable mode packet that does not update a decompression context when the operation mode is R mode.

5. The method according to claim 3, wherein said non-reference packet is a robust header compression reliable mode packet that does not update a decompression context when the operation mode is R mode.

6. The method according to claim 4, wherein said reliable mode packet is a R-1 mode packet.

7. A method, comprising:
controlling header decompression for a link of a packet data network;
setting a predetermined header extension size for said link;
comparing a size of a received extension header with said predetermined header extension size; and
suppressing transmission of an acknowledgement when an extension header of a size larger than said predetermined header extension size has been received,
wherein the setting the predetermined header extension size and the suppressing the transmission of the acknowledgment are aspects of the controlling header decompression.

8. The method according to claim 7, wherein said header decompression is based on a robust header compression scheme, the method further comprising:
performing a transition to a reliable mode in response to the receipt of a large extension header list.

9. The method according to claim 7, further comprising:
maintaining said suppression until an extension header list of a size less or equal to said predetermined header extension size has been received.

10. The method according to claim 8, further comprising:
maintaining said suppression until an extension header list of a size less or equal to said predetermined header extension size has been received.

11. An apparatus, comprising:
a controller configured to set a predetermined header extension size for a link of a packet data network, wherein the apparatus is configured to control header compression on the link;
a receiver configured to receive a packet comprising an extension header,
wherein the controller is further configured to compare the size of the received extension header with said predetermined header extension size; and
a processor configured to generate a non-reference packet that will not be used as reference for subsequent decompression, when an extension header of a size larger than said predetermined header extension size has been received.

12. The apparatus according to claim 11, wherein said processor is configured to compress headers based on a robust header compression scheme and said processor is configured to generate a U mode or O mode packet without generation identifier or a reliable mode packet as said non-reference packet.

13. An apparatus, comprising:
a controller configured to set a predetermined header extension size for a link of a packet data network, wherein the apparatus is configured to control header decompression for the link,
wherein the controller is further configured to compare a size of a received extension header with said predetermined header extension size; and
a processor configured to suppress transmission of an acknowledgement when an extension header of a size larger than said predetermined header extension size has been received.

14. The apparatus according to claim 13, wherein said processor is configured to perform said header decompression based on a robust header compression scheme, and to perform a transition to a reliable mode in response to the receipt of a large extension header list.

15. A system, comprising:
a compression apparatus configured to control header compression on a link of a packet data network,
wherein said compression apparatus comprises:
a first controller configured to set a predetermined header extension size for said link,
a receiver configured to receive a packet comprising an extension header,
wherein the first controller is further configured to compare the size of the received extension header with said predetermined header extension size, and
a first processor configured to generate a non-reference packet that will not be used as reference for subsequent decompression, when an extension header of a size larger than said predetermined header extension size has been received; and
a decompression apparatus configured to control header decompression for a link of a packet data network,
wherein said decompression apparatus comprises:
a second controller configured to set a predetermined header extension size for said link,
wherein the second controller is further configured to compare a size of a received extension header with said predetermined header extension size, and a second processor configured to suppress transmission of an acknowledgement when an extension header of a size larger than said predetermined header extension size has been received.

16. A computer program, embodied on a computer readable storage medium, configured to control a processor to implement a method, the method comprising:

controlling header compression for a link of a packet data network;

setting a predetermined header extension size for said link;

receiving a packet comprising an extension header;

comparing the size of the received extension header with said predetermined header extension size; and transmitting a non-reference packet that will not be used as reference for subsequent decompression, when an extension header of a size larger than said predetermined header extension size has been received, wherein the setting the predetermined header extension size and the transmitting the non-reference packet are aspects of the controlling header compression.

17. A computer program, embodied on a computer readable storage medium, configured to control a processor to implement a method, the method comprising:

controlling header decompression for a link of a packet data network;

setting a predetermined header extension size for said link;

comparing a size of a received extension header with said predetermined header extension size;

suppressing transmission of an acknowledgement when an extension header of a size larger than said predetermined header extension size has been received, wherein the setting the predetermined header extension size and the suppressing the transmission of the acknowledgment are aspects of the controlling header decompression.

* * * * *